United States Patent
Richter

[15] 3,653,499
[45] Apr. 4, 1972

[54] STORAGE STABLE PARAFORMALDEHYDE STERILIZING COMPOSITION

[72] Inventor: Ferdinand Joseph Richter, Danbury, Conn.

[73] Assignee: American Cyanamid Company, Stamford, Conn.

[22] Filed: Mar. 2, 1970

[21] Appl. No.: 15,448

Related U.S. Application Data

[63] Continuation-in-part of Ser. No. 798,542, Jan. 28, 1969, abandoned, Continuation-in-part of Ser. No. 636,501, May 5, 1967, abandoned.

[52] U.S. Cl. ..........................206/47 A, 424/128, 424/342
[51] Int. Cl. ................B65d 79/00, A61k 27/00, A61l 13/00
[58] Field of Search ........................424/342, 128; 206/47 A

*Primary Examiner*—Sam Rosen
*Attorney*—Samuel Branch Walker

[57] ABSTRACT

A dry two-part composition or substantially anhydrous one-part composition produces a clear, aqueous, storage stable, germicidal, sporicidal and detergent composition which prevents coagulated blood from adhering to instruments during sterilization, etc., and is used to decontaminate surgical items, such as needles and sponges. One part of the composition is paraformaldehyde having an average molecular weight of about 360 free from polymer chains over a molecular weight of 3,000. The melting point in a sealed tube does not exceed 172° C. The remainder of the composition contains an alkali metal tripolyphosphate and a water soluble buffer, such as sodium carbonate, to give a final aqueous solution having a pH between about 10 and 11. If the materials are substantially anhydrous, that is to say, free from chemically unbound water, all of the constituents can be mixed together in a powder and stored in a container hermetically sealed against the entrance of moisture. If the constituents or any of them are not substantially anhydrous, the composition must be in a two-part package separately sealed in waterproof pouches, one containing the paraformaldehyde and the other the polyphosphate and buffer.

9 Claims, 2 Drawing Figures

Patented April 4, 1972

INVENTOR
FERDINAND JOSEPH RICHTER
BY
Samuel Branch Walker
ATTORNEY

INVENTOR.
FERDINAND JOSEPH RICHTER

STORAGE STABLE PARAFORMALDEHYDE STERILIZING COMPOSITION

RELATED APPLICATIONS

This application is a continuation-in-part of my prior application 794,542, filed Jan. 28, 1969, which in turn was a continuation-in-part of my earlier application Ser. No. 636,501, filed May 5, 1967. Both of the applications referred to are now abandoned.

BACKGROUND OF THE INVENTION

Aqueous formaldehyde solutions have been used for many years as a germicidal media. The solutions do not have long storage stability as the initially clear solutions tend to become turbid with subsequent depositions of solid residue on the bottoms of containers. The turbidity, even where it does not destroy the effectiveness of the solution, presents an unesthetic appearance and is not practically acceptable.

Another disadvantage of previously used aqueous formaldehyde solutions is their tendency to coagulate blood, serum, and certain other organic matter. Once coagulation has occurred it is difficult to remove these materials from such things as surgical instruments, and removal of blood or other coagulatable material must precede the immersion of instruments in the aqueous formaldehyde solution. This creates a serious problem as the solutions are often used in containers in which contaminated material, such as surgical instruments, are to be placed. If it is necessary to first remove all blood or coagulatable matter before immersion, this is undesirable, expensive, and unacceptable in hospital operating rooms.

Another disadvantage of aqueous formaldehyde solutions is that they present a problem in shipping, storing and handling, and of course require the shipping of a large amount of water as the solutions usually contain about 8 to 10 percent formaldehyde.

It has been proposed to make up solutions by the depolymerization of paraformaldehyde, which is reasonably stable and which can be shipped in dry form. However, it is extremely difficult to produce clear solutions even when other chemicals are added to the water or other solvent in which the paraformaldehyde is dissolved. Even when alkaline agents, such as sulfites, carbonates, tetraborates, pyrophosphates and the like, are used which have detergent action and which can aid in maintaining a sufficiently alkaline pH so that depolymerization of paraformaldehyde proceeds with reasonable rapidity, no satisfactory paraformaldehyde compositions have been developed which will dissolve completely to a solution of formaldehyde free from apparent turbidity which keeps well and does not become turbid on standing.

A typical solution proposed in the past consists of 1 percent sodium hexametaphosphate, 7 percent sodium citrate, 10 percent sodium carbonate, 10 percent sulfonated castor oil, and 10 percent paraformaldehyde, the remainder being water. The pH of the solution was a little over 8 and the pH itself was quite stable on standing. However, no clear solution could be produced, and even the highly turbid solution which could be made took many hours. The paraformaldehyde which was available at the time, more that 20 years ago, was high molecular weight paraformaldehyde. The typical solution above described also presented another problem because it was not practical to make it up in solid form even in two separate containers, one containing paraformaldehyde and the other the additional ingredients. When this is attempted, severe caking results, and hence the solution was primarily useful in already formed solution, which of course presented problems in shipping because of the large amount of water that had to be shipped. This disadvantage is in addition to the major disadvantage of inability to dissolve rapidly in water and the impossibility of producing a clear solution even when the long time had elapsed.

SUMMARY OF THE INVENTION

The present invention uses a composition in dry form of a particular kind of paraformaldehyde which has a low average molecular weight, preferably of the order of about 360, and is free from long chain polymers having molecular weights up to 3,000 and over. It has been found that these higher polymers do not completely depolymerize and they prevent the formation of clear, stable formaldehyde solutions. the other constituents of the dry composition are in alkali metal tripolyphosphate, a buffer, such as sodium carbonate, which together with the buffering action of the tripolyphosphate maintain a pH of the solution prepared between approximately 10 and 11. Where corrosion is a problem, corrosion inhibiters are also added. The lower limit on pH is not critical, and useful results are obtainable if the amount of buffer falls to the point where a pH of about 9.5 or higher is produced. It should be noted that the pH is the pH of all of the ingredients as the tripolyphosphate has some buffering action and, therefore, requires somewhat less of the additional buffer, such as sodium carbonate, than would be needed to maintain the same pH if there were no tripolyphosphate.

Up to recently the particular paraformaldehyde required was not available in substantially anhydrous form. The specification required less than 5 percent of water. Now the paraformaldehyde is obtainable in substantially anhydrous form, that is to say, free from chemically unbound water, and the tripolyphosphate and buffer are also obtainable in anhydrous form, as are corrosion inhibitors. When substantially anhydrous material is used, all of the constituents can be mixed together in powder form and filled, under substantially anhydrous conditions, into a waterproof container, such as a plastic bottle, which is sealed tight against entrance of any moisture. Such a package keeps for a year or more, and this is the preferred form. If desired, as an additional precaution a bag of desiccant, such as silica gel, may be included in the package.

If the constituents are not completely anhydrous, for example if the paraformaldehyde contains a few percent of chemically unbound water even though less than 5 percent, the constituents cannot be mixed together as even the small amount of chemically unbound water in the paraformaldehyde renders such a composition storage unstable over long periods of time. However, with paraformaldehyde which is not completely anhydrous, as described above, the composition can be made physically into two portions, for example in two waterproof pouches, which can advantageously be unitary with a tear zone separating them. The two-pouch packages are just as storage stable as the one-part package where the materials are substantially anhydrous. The two pouches are perfectly useful, but somewhat less convenient than the anhydrous mixture of all constituents in a moisture-tight package. Either a single package mixture of substantially anhydrous materials or the two-part package where the formaldehyde is not anhydrous are included in the broader aspects of the present invention, although in a more specific aspect the preferred anhydrous single package is claimed as a part of the invention.

It should be noted that where there is a single package with anhydrous materials or a two-part package where at least one of the materials is not anhydrous, the nature of the package is a part of the invention, although it is not the feature which distinguishes the present invention from the prior art. Moisture tight sealed bottles and other containers for other purposes are not unknown things, and while such a known type of container is a part of the present invention, it is not the distinguishing feature. With two-part packages, however, the nature of the package is not conventional or well known, and so in another specific aspect of the invention this type of packaging is specifically included.

Regardless of whether the composition is anhydrous and in a single package or not completely anhydrous and in a two-part package, the same ranges of materials are used and the following general summary describes them and the method of making the clear solution without distinguishing the particular modification. In describing preferred embodiments below, however, the two particular modifications will be described individually.

The amount of the essential alkali metal tripolyphosphate may vary between 4 percent and 100 percent of the weight of the paraformaldehyde. Best results are obtained between about 6 percent and 10 percent, although the larger amounts do no harm. The upper limit is in general determined by the fact that if there is too much salt present some of the paraformaldehyde will salt out, which does not permit forming a clear solution, which is one of the essential desirable features of the present invention. The upper limit also is determined to some extent by economics, as of course there is no point in using more material than is required as this only adds to the expense of the composition.

The amount of buffer when the preferred sodium carbonate buffer is used should be at least about 6 percent of the weight of the paraformaldehyde. This will give a pH just below 10, for example about 9.6 when used with the smaller amounts of alkali metal tripolyphosphate. There is no critical upper limit on the amount of the buffer except as dictated by pH as paraformaldehyde is not salted out by even large amounts of sodium carbonate. 100 percent, however, represents a practical upper limit.

It is an advantage of the composition of the present invention that when the materials are added to water the temperature of the water is not critical. Clear solutions can be obtained eventually even with cold water, but the solution is so slow that in practice it is desirable to use warm or hot water. Temperatures corresponding to hot water obtainable from the ordinary hot water tap, 50° to 65° C., are quite satisfactory. When water in this temperature range is used, the composition in either modification dissolves to a crystal clear solution with a minimum of agitation in from 2 to 5 minutes. This is fast enough for practical use and it is not necessary to use still hotter water, such as boiling water, as the results, while practical, are no better than with hot water from a hot water tap. Any increase in speed is negligible and does not warrant the additional complication of preparing the hotter water. As a matter of fact, very hot water tends to produce more formaldehyde fumes during the solution, which can be irritating.

It is not known why the alkali metal tripolyphosphates, such as the preferred sodium tripolyphosphate, behave differently from other phosphates or alkaline agents or detergents, and therefore the present invention is not limited to any theory of why this should be so. However, the use of the alkali metal tripolyphosphate, in at least the minimum amounts specified, is essential to the invention.

When the two-pouch modification is used, the materials of which the pouches are made are not particularly critical. They should not permit passage of excessive amounts of moisture and should prevent undue escape of formaldehyde vapors. Very satisfactory materials are polyolefines or laminates of polyolefines with polyesters or metal foil, such as aluminum foil.

It should be noted that even if an alkali metal tripolyphosphate is used, the results of the present invention are not obtained with any paraformaldehydes which do not have the correct limitations on molecular weight, and therefore the invention must be considered as a combination in which the composition must have both the tripolyphosphate and the particular kind of paraformaldehyde in the proportions above set out.

It is an advantage that the solutions produced from the compositions of the present invention disperse coagulated blood or other proteinaceous materials which may be sticking to utensils, such as surgical instruments, and it is therefore not necessary to remove these materials completely before the instruments are sterilized by the germicidal solution.

DESCRIPTION OF THE PREFERRED EMBODIMENTS

Figure 1:
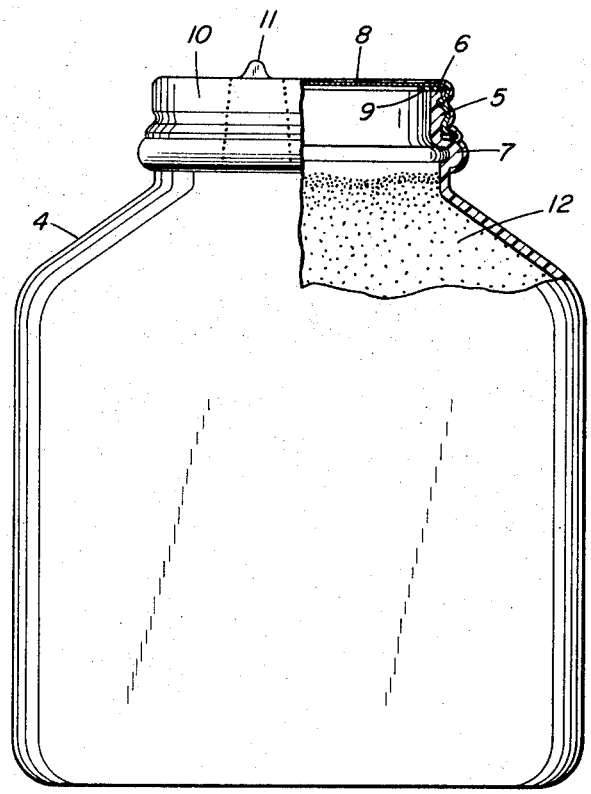
FIG. 1 is an elevation, partly broken away, of a container with a mixture of all the anhydrous ingredients.

FIG. 1 illustrates a container, a plastic or glass bottle, (4) with a threaded top (5), top rim (6), and shoulder below the threads (7). The composition with all of the ingredients, paraformaldehyde, tripolyphosphate, buffers, and the like, are shown at (12) and are filled into the container under substantially anhydrous conditions. An example of the powder formulation will be described below. After the container is filled, a cap (8) is screwed on, which cap has an elastomeric gasket (9) that bears on the upper edge of the container top (6). This constitutes a moisture tight seal, and for further protection a plastic cap (10) with a tear tap (11) tightly surrounds the cap, fitting underneath the shoulder (7). This additional plastic seal, while not absolutely necessary, is a desirable additional protection against the entrance of any moisture so that the containers can be stored for long periods of time, a year or more, without any deterioration.

A typical formulation of the composition (12) is as follows: 83 gm. of paraformaldehyde having a number average molecular weight of approximately 360 and free from any polymer chains of molecular weight as high as 3,000 has the following characteristics: It is a dry powder having a chemically unbound water content of not over 3 percent. The powder is free flowing, with not more than 5 percent retained on a 200-mesh sieve. The ash content is 0.1 percent or less, acidity level 0.05 or less, sealed tube melting point range not in excess of 172° C. The paraformaldehyde content is at least 95 percent. 5 gms. of anhydrous sodium tripolyphosphate and 5 gms. of anhydrous sodium carbonate are mixed with the formaldehyde together with 2 gms. of anhydrous sodium nitrite, 2 gms. of anhydrous sodium benzoate, and, if desired, anhydrous coloring matter and perfume.

When the composition is to be used, the tear strip (11) of the outer seal is torn off, the seal (10) removed, and the cap (8) unscrewed. The contents of the container is poured into about one quart of hot water, about 60°C., in a jug. The contents are swirled until a clear solution is produced, which takes about 2 to 3 minutes, which can be stored if necessary for several years. The solution has high germicidal action and a pH from 10 to 11. It does not become turbid on standing and prevents sticking of coagulated blood. The solution is effective in preventing the growth of most micro-organisms even in a 1,000:1 dilution and even in the presence of 10 percent human serum. Among typical organisms is mycobacterium tuberculosis, which is killed within 10 minutes by the solution.

If desired, solutions can be made up in other suitable polar solvents, such as aqueous methyl or ethyl alcohol.

When contaminated surgical instruments were immersed in a solution made up as described, they were completely sterile and were cleansed without sticking of coagulated blood, serum or mucus. The cleansing action was so marked that even instruments having hinges, which are notoriously difficult to clean, were entirely clean.

Figure 2:
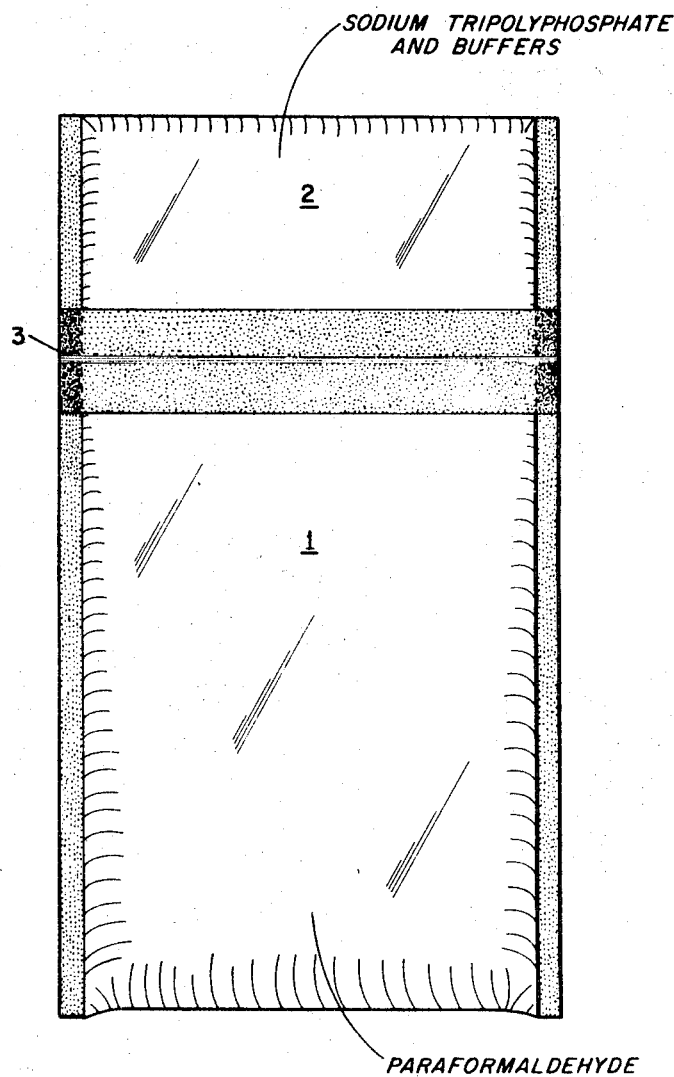
FIG. 2 is an elevation of a double plastic pouch with separate pouches for the two kinds of ingredients of the composition.

FIG. 2 shows an integral double pouch with a larger pouch (1) containing paraformaldehyde and a smaller pouch (2) containing the tripolyphosphate and other ingredients. The paraformaldehyde had in general the specifications given above, but it was not completely anhydrous, the water content being less than 5 percent. The specification is of a typical commercially available paraformaldehyde as sold by the Tenneco Company under their designation "Paraformaldehyde Powder U.S.P. X Grade." The amount of tripolyphosphate, sodium carbonate, etc., was as given for the example illustrated by FIG. 1. Between the two pouches (1) and (2) there is a region (3) where the plastic has been sealed to facilitate tearing the pouches open when a solution is to be made up. The pouches were laminates of polyethylene with aluminum foil and were moistureproof.

When sealed in the separate pouches the products can be stored for a year or more even under unfavorable conditions without deterioration, and when used, solution takes place quickly, as has been described in conjunction with FIG. 1. If the powders are mixed and kept in a single pouch in an atmosphere of uncontrolled humidity, deterioration was not serious at very low temperatures of 4.26° C. At room temperature, however, while the powder appeared satisfactory after a year's storage and could be dissolved in hot water to form a clear solution, the solution became turbid on standing. At 27° C. and 50° C., after a year's storage the powders, when mixed, caked and it was not possible even to prepare a clear solution initially. In the separate pouches, as has been described in conjunction with FIG. 2, no caking took place after a year under the same conditions described above and the composition formed clear solutions readily with hot water and the clear solutions did not develop turbidity on standing. When the solutions were made up, their cleaning effectiveness was the same as described in conjunction with the modification shown in FIG. 1.

The stock solution described in conjunction with the two examples illustrated by FIG. 1 and FIG. 2 can vary somewhat from the exact amounts set forth, but in general the amount of paraformaldehyde is an optimum in solutions having at least 6 percent of formaldehyde and not in excess of 10 percent.

I claim:

1. A one-part substantially anhydrous dry composition in powder form in a closed, moistureproof container, the composition being a mixture of freeflowing, substantially anhydrous paraformaldehyde powder said paraformaldehyde having a molecular weight of about 360 and being substantially free from polymeric chains with a molecular weight of 3,000 or more and having a melting point in a sealed tube of not more than 172° C., an anhydrous alkali metal tripolyphosphate powder in amount from 4 to 100 percent of the weight of the paraformaldehyde, and an anhydrous, water soluble buffer capable of maintaining a pH from about 10 to 11 when the composition is dissolved in water, the amount of soluble buffer being at least 6 percent of the paraformaldehyde by weight and less than an amount which results in salting out paraformaldehyde when dissolved in water.

2. The composition according to claim 1 in which the tripolyphosphate is sodium tripolyphosphate and the buffer is sodium carbonate.

3. The composition according to claim 2 in which the composition also contains corrosion inhibiting compounds in anhydrous form which are soluble in water.

4. A package having therein a two-part dry composition in two separate closed compartments, which composition is suitable for preparing a clear and stable germicidal solution, the improvement comprising in combination,
   a. a first closed compartment containing paraformaldehyde powder said paraformaldehyde having a molecular weight of about 360 and being substantially free from polymeric chains with a molecular weight of 3,000 or more and having a melting point in a sealed tube of not more than 172° C., and
   b. a second closed compartment containing an alkali metal tripolyphosphate powder in an amount from 4 to 100 percent of the weight of the paraformaldehyde and a water soluble buffer capable of maintaining a pH of from about 10 to 11 in water solution when the contents of the two containers are dissolved together in water, the amount of the soluble buffer being at least 6 percent of the paraformaldehyde by weight and less than an amount which results in salting out paraformaldehyde when dissolved in water.

5. A package according to claim 4 in which the tripolyphosphate is sodium tripolyphosphate and the buffer is sodium carbonate in amounts from at least 6 percent by weight of the paraformaldehyde and less than that which results in salting out paraformaldehyde on solution of the composition in water.

6. A package according to claim 5 in which the compartment having the tripolyphosphate also contains corrosion inhibiting compounds soluble in water.

7. A package according to claim 4 in which the compartments are integral plastic pouches.

8. A package according to claim 5 in which the compartments are integral plastic pouches.

9. A package according to claim 7 in which the pouches are of laminated polyolefine.

* * * * *